Dec. 26, 1944.  G. KEINATH  2,365,706
TEMPERATURE COMPENSATED CONDITION RESPONSIVE MEASURING SYSTEM
Filed Jan. 24, 1942
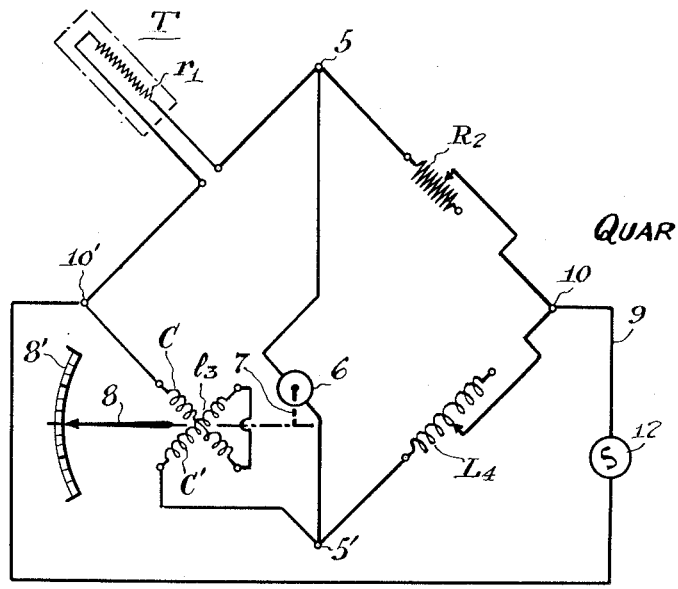
Fig. 1
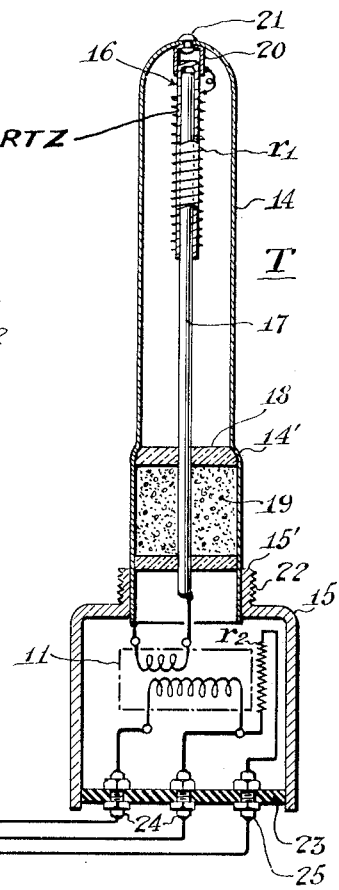
Fig. 2
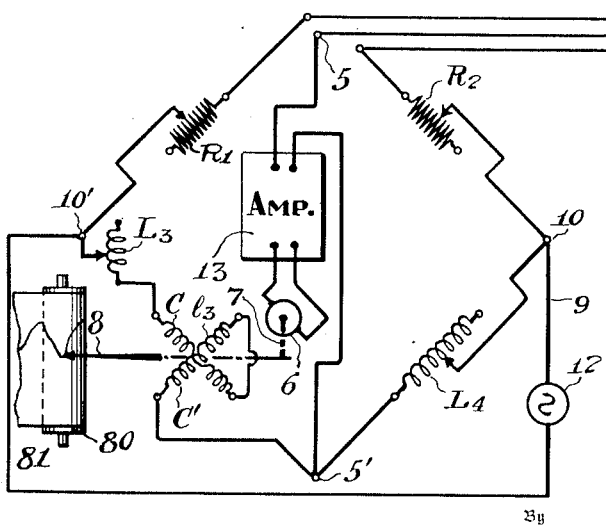
Inventor
George Keinath
Henry Lanahan
Attorney Patented Dec. 26, 1944

2,365,706

UNITED STATES PATENT OFFICE 2,365,706

TEMPERATURE COMPENSATED CONDITION RESPONSIVE MEASURING SYSTEM

George Keinath, Larchmont, N. Y.

Application January 24, 1942, Serial No. 428,028

9 Claims. (Cl. 73—362)

This invention relates broadly to indicating instruments and, more particularly, to that type of indicating instrument adapted for making a permanent continuous record of indications on a chart. The invention relates especially to instruments of the null-motor type for recording temperature, and is accordingly herein illustrated and described in terms of such an instrument.

In a recorder of the instant invention, there is employed a Wheatstone bridge circuit wherein a motor serves as a null detector and also as the actuator for the balancing and indicating means of the instrument. One branch of this bridge circuit has a temperature responsive element as one arm, which may be the temperature-responsive resistor of a resistance thermometer or radiation bolometer, and has a standard resistance element as the other arm; the other branch has a variable inductance element of the variometer type as one arm—which is placed in corresponding relation to the temperature responsive element of the other branch—and has a fixed standard inductance as the other arm. Connecting the junctions in the branches between the arms is a reversible motor which has a mechanical drive connection with the movable coil of the variometer and with the indicator. When an unbalance occurs in the bridge circuit from a variation in resistance of the temperature responsive element, a potential develops across the motor and the motor is actuated in one direction or the other, depending upon the direction of unbalance, to cause the variometer to be so adjusted as to nullify the unbalance, the degree of adjustment of the variometer being an indication of the variation in resistance of the thermometer initially causing the unbalance. The use of an inductive variometer as the balancing means of the bridge circuit for the recorder, in place of a slide wire as is so common in American practice, has the distinct advantage of rendering the recorder more reliable and durable, for a variometer has no sliding contacts and is not affected by wear or corrosion.

To realize a rugged construction of a resistance thermometer which is capable of being readily manufactured and of having a high degree of accuracy, the resistance thermometer should be designed on a low resistance basis. It is however undesirable to design the bridge circuit for the recorder on a low impedance basis, such as would be required were a temperature responsive element of low resistance placed directly in the bridge circuit, for then the resistance of lead connections in the bridge circuit would be of a sufficiently high relative order to become a source of error. In accordance with my invention, however, I employ a low resistance temperature responsive element and yet also a bridge circuit having relatively high impedance elements; this I do by connecting the temperature responsive element to the bridge circuit through a resistance step-up transformer. The bridge circuit is thus restricted to A.-C. operation, but A.-C. operation has a number of distinct advantages over D.-C. operation, particularly in that it permits the construction of a highly sensitive and stable recorder wholly devoid of sliding contacts, as will hereinafter appear.

It is accordingly an object of my invention to provide a recording instrument of a rugged and dependable construction having a high degree of accuracy and sensitivity.

It is another object to provide a recorder system which is wholly devoid of sliding contacts, and which is adaptable to cover wide ranges of measurement.

Another object is to provide a recorder of the null-motor type having an improved accuracy, sensitivity and durability.

A further object of my invention is to provide improved means and method for adjusting a recorder bridge circuit to prescribed ranges of measurement, while attaining a large measure of standardization of its parts.

A yet further object is to provide compensation for temperature variable errors in automatic null-motor recorders.

It is a yet further object to provide an improved mechanical construction and arrangement of a resistance thermometer.

Other and allied objects of my invention will more fully appear from the following description and the appended claims.

In the description of my invention reference is had to the accompanying drawing, of which:

Figure 1 is a schematic view illustrating a measuring system according to my invention; and Figure 2 is a partially structural and partially schematic view illustrating my invention as applied to the measurement of temperature with the use of a preferred design of a resistance thermometer.

In both figures, a temperature responsive measuring device, hereinafter called briefly a "thermometer" is denoted as a whole by the reference letter T. This device contains a temperature responsive resistor $r_1$.

The system shown in Figure 1 comprises a measuring circuit serially including resistor $r_1$ as one arm and a resistance element $R_2$ as another arm and comprises another branch circuit serially including inductance elements $l_3$ and $L_4$ as separate arms of which the inductance $l_3$ is a variometer comprising relatively angularly adjustable coils C and C'. (For convenience, these arms are hereinafter referred to by the subscripts of their respective elements.) The resistance $R_2$ and inductance $L_4$ are standard elements but each is preferably adjustable as is shown. Connecting the junction 5 between $r_1$ and $R_2$ and the junction 5' between $l_3$ and $L_4$ is a zero branch which contains a reversible control means formed by a reversible motor 6. This motor has a mechanical drive connection 7 (diagrammatically shown) to the variometer $l_3$ and to an indicating means herein simply shown as a pointer 8 and scale 8', it being understood that the pointer is secured directly to the movable one of the coils of the variometer to move in unison therewith. Current is supplied to the bridge circuit from an A.-C. source 12 through leads 9 which connect to the junctions 10 and 10' of the two branches of the bridge circuit.

It will be understood that when the bridge is balanced, junction points 5 and 5' have the same potential and no current flows through the zero branch containing the motor 6. When the bridge is however unbalanced by a variation of the resistance $r_1$ of the thermometer T, current will flow through the motor 6 and cause the motor to turn the movable coil of the variometer, the drive connection 7 being so arranged that this turning of the coil will be in a direction to vary the inductance of the variometer to rebalance the bridge circuit and restore the current through the motor to a substantially null value. Thus the motor, acting as a null detector, will adjust the variometer to rebalance the bridge upon each unbalancing thereof, and will then come to rest. For a prescribed characteristic of resistance $r_1$ vs. temperature and for a like characteristic of the inductance $l_3$ vs. angular deflection of its movable coil the angular deflections of the movable coil of the variometer to maintain the bridge balanced are directly proportial to the temperature variations of the resistance $r_1$ and will be indicated by the angular deflections of the pointer 8 relative to the scale 8'. Hence, the adjustment of the indicating device 8, 8', automatically effected by the just-described circuit means, is indicative of the temperature to be measured.

It will be seen that null-motor recorders utilizing variometers as the balancing means are not confronted with contact trouble or with problems in wear and corrosion such as are encountered with recorders using sliding wires as the balancing means. Moreover, it will be seen that the variometer may be designed to have a substantially linear scale of inductance vs. angular deflection of its movable coil, or may have a non-linear scale to meet particular applications as the conditions may require.

For best sensitivity, the arms of the bridge circuit should be substantially equal in impedance; while to rule out the resistance of lead connections in the bridge circuit as a source of error, the elements directly connected in the bridge circuit should have a substantial value of impedance as of the order of 100 ohms or more. A resistance having a temperature responsive resistance value of 100 ohms at zero degrees C. cannot be readily made rugged or very accurate as the wire constituting the resistance $r_1$ must be too fine to be practical. These difficulties are however largely overcome when the temperature responsive resistance is made to have a low value of resistance, say of the order of only one ohm at zero degrees C.; also, the insulation requirements for the wire are then greatly relaxed. The temperature responsive resistance of the thermometer must however be stepped up to present the desired 100 ohms to the bridge circuit. This is done by means of a resistance transformer 11 having a step-up in impedance transformation ratio of 1:100, or in other words a turns ratio of 1:10, and serving as a coupling between the temperature responsive resistance and the measuring circuit proper. It is of course understood that the use of the resistance transformer 11 limits the bridge to A.-C. operation—that is, to being supplied with alternating current from an A.-C. potential source, which may be an independent source 12 as aforementioned, or from a regular 60-cycle lighting circuit. A.-C. operation is however preferred as it has the advantage of permitting a greater latitude of design of the bridge circuit in enabling the use of either resistance, inductance or capacitance elements, and of permitting the use of an A.-C. amplifier 13 (diagrammatically shown) between the junctions 5 and 5' and the motor 6, as appears in Figure 2, for increasing the sensitivity of the recorder, which amplifier is preferable to a D.-C. amplifier because of its greater stability. Furthermore, A.-C. operation has the highly important advantage of ruling out the need for any sliding contacts in the bridge circuit, as has been hereinbefore explained, and of permitting the use of an A.-C. motor as the null detector, which also may be devoid of sliding contacts.

The resistance transformer 11 is to have a relatively low order of dissipation—i. e., of copper (or resistance) and iron loss. For instance, the effective losses in the transformer expressed in ohms should not be greater than about five per cent of the active resistance of the thermometer. The losses in the transformer should also not vary appreciably with temperature since the transformer and resistance $r_1$ are preferably placed adjacent to one another in one housing to get a low resistance connection between the resistance $r_1$ and the primary of the transformer. In this case the transformer will be subjected in substantial degree to the temperature variations to be measured, and must have a high heat resistant insulation, as of asbestos, to withstand high temperatures. The embodiment shown in Fig. 2 exemplifies the just-mentioned conditions. According to this figure, the resistor $r_1$ is arranged in a tube 14 and the transformer in a head 15 integral with the tube. In the arrangement according to Fig. 2, the pointer 8 of the measuring instrument forms the stylus of a recorder of customary type whose drum 80 accommodates a recording sheet or tape 81 to be written upon by the stylus.

My invention contemplates compensating for variations in the losses within the transformer by the use of a compensating means located in juxtaposition to the transformer within the head 15. Unless an especially high degree of accuracy in measurement is required, no compensation is required for the iron losses (from hysteresis and eddy currents) as these losses can be reduced to a very low level by the use of low-loss nickel-iron alloys in the magnetic core of the transformer. The copper losses need however to be compensated for. This I do by placing a copper resistor $r_2$ in the head 15 in thermal contact with the transformer 11 and in series with the fixed standard resistance $R_2$ between the junctions 5 and 10. As this resistance $r_2$ is in the arm 2 of the bridge circuit separate from the arm 1 including the resistance transformer, it will serve to annul the effects in the bridge circuit of variations in the copper losses of the transformer 11, it being of course understood that the value of the resistance $r_2$ is appropriately selected to give the desired compensation.

While the thermometer T may have a wide temperature range of application, there is yet need to adjust the bridge itself to the particular ranges of measurement desired in the respective applications. It is highly desirable that these range adjustments of the bridge be permitted to be made without need for different variometers, as then the variometer $l_3$ is standardized for all applications with the result that a greater uniformity in manufacturing is obtained for the recorders. In accordance with my invention the variometer $l_3$ is so standardized, and the adjustment of the bridge to the desired temperature ranges is made by adjusting the values of the standard elements $R_2$ and $L_4$ and by adding a suitable constant inductance $L_3$ in series with the variometer $l_3$. Expressed mathematically, the relation which exists between the variometer $l_3$ and the other bridge elements is $$l_3 = nr_1 \frac{L_4}{R_2} - L_3$$

or alternatively, that between $r$ and the other bridge elements is $$r_1 = \frac{R_2}{nL_4}(l_3 + L_3)$$

where $n$ is the impedance transformation ratio of the transformer 11. These equations show clearly what degree of variation of the bridge elements is required to obtain a particular range adjustment of the bridge. While not being taken into account in these equations, there may be inserted an adjustable resistance $R_1$ in series with the secondary of the transformer 11 for the purpose of compensating for manufacturing variations in this transformer.

Since the inductance elements in the bridge circuit necessarily have some ohmic resistance, not however indicated in the figures, it will be understood that for A. C. operation of the bridge a true balance is not obtained until the resistances of arms 1 and 2 are balanced both with respect to the inductances of arms 3 and 4 and to their ohmic resistances. This requirement predetermines that the power factor of the inductances $L_3$ and $l_3$ of arm 3—that is, the ratio of the sum of these inductances to the sum of their ohmic resistances—is the same as the power factor of the inductance $L_4$ of arm 4. When the power factors of arms 3 and 4 are equal the bridge will be independent of ambient temperature. Accordingly, in adjusting $L_4$ and $L_3$ to adapt the bridge to different ranges of measurement, the same power factor in the arms 3 and 4 is to be maintained. In practise, this cannot be realized throughout the range of measurement of the instrument for the inductance of the variometer $l_3$ is varied without variation in its ohmic resistance. As a compromise, however, these power factors are adjusted to be the same when the bridge is indicating the median temperature in its range of greatest use, as when the pointer 8 is at the center of the scale.

The resistance $r_1$ of the thermometer T comprises a coil of wire composed preferably of platinum and made relatively heavy, say as large as .3 mm. in diameter. The use of such heavy wire provides a high degree of accuracy, for the accuracy increases with the diameter of the wire. In particular, when the wire has a large cross-sectional area, it has less area of exposed surface per unit volume and is subject to less percentage contamination—that is, for a given volume of wire it will not alloy with other metals, will not adsorb and dissolve gases and will not acquire deposits of vaporized metals to the extent that it would were it made with a smaller area of cross-section.

Although the wire element constituting the resistance $r_1$ is made heavy, there is yet need to have it protected in every practically possible way. To this end, it is encased in the tube 14 and mounted on a quartz tube 16 as shown in Figure 2. This quartz tube is telescoped over the end of a rod 17 which is held concentrically within the tube 14 by a pair of spaced porcelain washers 18 that embrace the outer end portion of the rod and fit the interior of the tube 14, the inner washer being for example abutted against a shoulder 14' on the tube 14 and the space between the washers being suitably filled as with a quartz sand 19. An auxiliary support for the quartz tube 16 is formed by a cap member 20 which fits over the end of the tube 16 and which has a central projecting post 21 that extends through the end of the tube 13 and is welded thereto.

Suitably secured to the open end portion of the tube is the head 15 aforementioned. This head has a reduced diameter portion 15' embracing the tube 14 and threaded at 22 to facilitate connecting the same to a support. The part of the head 15 extending beyond the tube 14 is enlarged in diameter to receive the transformer 11 and the compensating resistance $r_2$. Closing the end of the head 15 is a Bakelite disk 23 which tightly fits the interior of the head.

To provide connections between the resistance $r_1$ and the primary of the transformer 11 having a magnitude of resistance negligibly small in relation to that of the resistance $r_1$, one of these connections is made through the rod 17—the rod accordingly being provided with a relatively large diameter as of the order of 4 mm.—and the other lead connection is made through the cap 20 and outer tube 14. In order that what resistance these lead connections may have will not vary appreciably with temperature, the rod 17 and tube 14 are made of a metal having a low temperature coefficient of resistance, preferably of Nichrome. (Nichrome has also the advantage of being a poor heat conductor and of being thus unable to conduct the heat effectively to the head 15 and the transformer 11.) The lead connections of the secondary winding of the transformer 11 to the bridge circuit are made through terminals 24 mounted on the Bakelite disk 23. Also, one lead connection of the compensating resistance $r_2$ to the bridge circuit is made through a terminal 25 on the disk 23, the other lead connection of this compensating resistance being however made within the head 15 to one side of the secondary of the transformer 11 as is shown in Figure 2.

I have herein illustrated and described my invention in terms of certain preferred embodiments, but it will be understood that I do not intend any unnecessary limitation of my invention to these embodiments as the same are subject to many changes and modifications without departure from the scope of my invention, which I endeavor to express according to the following claims.

I claim:

1. In an A. C. automatic bridge for a temperature recording instrument: the combination of an impedance element responsive to variations in the temperature to be measured; a transformer connecting said impedance element to an arm of said bridge, said transformer having a loss variable with change in temperature of the transformer; and means to annul in said bridge the effects caused by variations in said loss comprising a temperature responsive impedance element in said bridge maintained at the temperature of said transformer.

2. In an A. C. automatic bridge for a temperature recording instrument: the combination of a first resistance variable with temperature; a transformer connecting said resistance to an arm of said bridge, said transformer having a copper loss varying with change in temperature of the transformer; and a second resistance variable with temperature and maintained substantially at the temperature of said transformer, said second resistance being connected into said bridge whereby to annul the effects in the bridge of variations in said copper loss.

3. An automatic bridge circuit for a measuring instrument comprising branch circuits serially including standard and variable impedance elements as a separate arms, the variable impedance element in one of said branch circuits being responsive to variations in a condition to be measured and the variable element in the other of said branch circuits consisting of a variometer; a null-motor detector connected to said branch circuits between said arms and having a drive connection with said variometer; and a second standard inductance connected serially in the arm including said variometer, all of said standard elements being adjustable in predetermined relations to one another whereby to adapt said bridge circuit to predetermined ranges of operation with the use of the same variometer.

4. An automatic bridge comprising a resistance branch circuit including standard and variable resistance elements as separate arms, said variable resistance element being responsive to variations in a condition to be measured; an inductance branch circuit including a standard inductance element and a variometer as separate arms, said variometer being controlled to balance the bridge; and a second standard inductance element serially connected in the arm including said variometer, said standard resistance and standard inductance elements being each adjustable whereby to adapt the bridge circuit for operation within prescribed ranges without altering said variometer.

5. An electric device for measuring temperatures, comprising in combination a temperature-responsive measuring resistor of relatively low impedance to be exposed to the temperature to be measured, an A. C. measuring circuit of relatively high impedance, a step-up transformer disposed close to said measuring resistor so as to be exposed to elevated temperature when in operation, said transformer having a low-impedance winding connected with said measuring resistor and a high-impedance winding connected with said circuit, compensating circuit means arranged close to said transformer and connected with said circuit so as to substantially annul therein the effects caused by impedance variations of said transformer due to variations in temperature, control means disposed in said circuit to respond to the resistance variations of said measuring resistor, an adjustable impedance device disposed in said circuit for counteracting the effect of said measuring resistor on said control means, said adjustable impedance device being connected with said control means to be controlled by the latter, and means for indicating the adjusted position of said impedance device as a measure of the temperature to be determined.

6. An electric device for measuring temperatures, comprising in combination a temparature-responsive measuring resistor of relatively low impedance to be exposed to the temperature to be measured, a balanceable A. C. measuring circuit of relatively high impedance, having a balance-responsive zero branch, a transformer disposed close to said measuring resistor so as to be exposed to elevated temperature when in operation, said transformer having a low-impedance winding connected with said measuring resistor and a high-impedance winding connected with said circuit for affecting the current condition of said zero branch in response to resistance variations of said measuring resistor, compensating circuit means arranged close to said transformer and connected with said circuit so as to substantially annul therein the effects caused by impedance variations of said transformer due to variations in temperature, a reversible control means connected in said zero branch, and an adjustable impedance device disposed in said circuit for counteracting the effect of said measuring resistor on said zero branch, said impedance device being connected with said control means to be controlled by the latter, whereby said impedance device is automatically adjusted to a position indicative of the temperature to be determined.

7. The combination with an A. C. measuring circuit, containing an indicating device and having relatively high impedance, of a circuit element responsive to a condition to be measured and having relatively low impedance, an electric coupling device arranged close to said circuit element so as to be affected by said condition, said coupling device having a low-impedance input circuit connected with said circuit element and a high-impedance output circuit connected with said measuring circuit, and compensating means also disposed close to said circuit element so as to be affected by said condition, said compensating means being connected with said measuring circuit for substantially nullifying the effect on said indicating device of variations of said coupling device due to said condition, whereby said indicating device is caused to indicate only the variations of said condition to be measured.

8. The combination with an A. C. circuit, for measuring temperatures, containing an indicating device and having relatively high impedance, of a temperature-responsive resistor to be exposed to the temperature to be measured, said resistor having relatively low impedance, a transformer arranged close to said resistor so as to be affected by said temperature, said transformer having a low-impedance winding connected with said resistor and a high-impedance winding connected with said circuit, and a compensating impedance arranged close to said transformer to be also affected by said temperature, said compensating impedance being connected with said measuring circuit for substantially nullifying the effect on said indicating device of variations of said transformer due to said temperature, whereby said indicating device is caused to indicate only the variations of said resistor.

9. The combination with an A. C. circuit, for measuring temperatures, containing an indicating device and having relatively high impedance, of a temperature-responsive resistor to be exposed to the temperature to be measured, said resistor having relatively low impedance, a transformer arranged close to said resistor so as to be affected by said temperature, said transformer having a low-impedance winding connected with said resistor and a high-impedance winding connected with said circuit, and a variable impedance controlled in accordance with the temperature-affected variations of said transformer and connected with said measuring circuit for substantially compensating the effect of said transformer variations on said indicating device so that the indications of said latter device are representative of the temperature to be measured.

GEORGE KEINATH.